(12) United States Patent
Reber et al.

(10) Patent No.: US 12,031,854 B2
(45) Date of Patent: Jul. 9, 2024

(54) MONOBLOCK SENSOR BODY AND METHOD OF ITS MANUFACTURING

(71) Applicant: Mettler-Toledo GmbH, Greifensee (CH)

(72) Inventors: Daniel Reber, Madetswil (CH); Christoph Lang, Schwerzenbach (CH)

(73) Assignee: Mettler-Toledo GmbH, Greifensee (CH)

( * ) Notice: Subject to any disclaimer, the term of this patent is extended or adjusted under 35 U.S.C. 154(b) by 353 days.

(21) Appl. No.: 17/701,878

(22) Filed: Mar. 23, 2022

(65) Prior Publication Data

US 2022/0307889 A1 Sep. 29, 2022

(30) Foreign Application Priority Data

Mar. 25, 2021 (EP) .................................. 21164802

(51) Int. Cl.
 *G01G 11/00* (2006.01)
 *B26F 3/00* (2006.01)
(52) U.S. Cl.
 CPC ............ *G01G 11/003* (2013.01); *B26F 3/004* (2013.01)
(58) Field of Classification Search
 USPC .......................................................... 177/1
 See application file for complete search history.

(56) References Cited

U.S. PATENT DOCUMENTS

| | | |
|---|---|---|
| 5,340,951 A | 8/1994 | Hungerbühler et al. |
| 7,024,948 B2 | 4/2006 | Eilersen |
| 7,093,506 B2 * | 8/2006 | Iiduka .................... G01L 1/26 73/862.637 |
| 7,345,249 B2 | 3/2008 | Burkhard et al. |
| 8,766,113 B2 | 7/2014 | Kusumoto et al. |
| 9,964,142 B2 * | 5/2018 | Rübel ............... B23K 26/0619 |
| 10,156,470 B2 * | 12/2018 | Yang .................... G01G 21/244 |
| 11,754,433 B2 * | 9/2023 | Hyer ........................ G01G 3/12 177/256 |
| 2024/0027256 A1 * | 1/2024 | Burkhard ............. G01G 21/244 |

FOREIGN PATENT DOCUMENTS

| | | | |
|---|---|---|---|
| DE | 19605087 A1 | 8/1997 | |
| ES | 1004813 U | 10/1988 | |
| WO | WO-2010092663 A1 * | 8/2010 | ........... G01G 21/244 |

* cited by examiner

*Primary Examiner* — Jacques M Saint Surin
(74) *Attorney, Agent, or Firm* — Standley Law Group LLP; Jeffrey S. Standley; Adam J. Smith (57) ABSTRACT

A monoblock sensor body of a load cell based on an electromagnetic force compensation mechanism has a Roberval mechanism. Mounting portions mount the fixed column to a housing side of a weighing module, and mount a load receiving member to the movable column. At least one of the mounting portions has at least one mounting hole that extends predominantly orthogonal to the load direction. One of the flexure point sections is closest to the mounting hole. A cavity associated with at least one of the mounting portions reduces an available solid angle for straight propagation paths that run from the inner thread to one or more of: the closest flexure point section, the coupling and the closest fulcrum. A material boundary of the body closes the cavity over at least a bridging width versus the height-side end of the body corresponding to the closest flexure point section.

17 Claims, 7 Drawing Sheets

MONOBLOCK SENSOR BODY AND METHOD OF ITS MANUFACTURING

TECHNICAL FIELD

The present invention is in the field of load detection. In particular, the invention is related to the kind of load detections where a Roberval mechanism is involved for receiving the load with its movable column, and a lever arrangement is provided, coupled to the movable column of the Roberval mechanism, and the load measuring principle is that of the electromagnetic force compensation, a corresponding mechanism being connected to the lever arrangement. Even more specifically, the invention relates to those types of load cells where the Roberval mechanism and a lever mechanism is defined within one single block of material, that is within a monoblock sensor body.

Even more specifically, the invention is related to a monoblock sensor body of a load cell based on an electromagnetic force compensation mechanism, comprising a Roberval mechanism, a lever arrangement coupled on the one hand side by a coupling to the movable column of the Roberval mechanism and on the other hand side connectable to the electromagnetic force compensation mechanism and having one or more levers with respective fulcrums, the body further comprising mounting portions for mounting the fixed column of the Roberval mechanism to a housing side of a weighing module, directly or indirectly via an intermediate arrangement, and/or for mounting a load receiving member to the movable column, directly or via an intermediate arrangement, at least one mounting portion thereof comprising at least one mounting hole extending preferably at least predominantly orthogonal to the load direction and in particular along the length direction of the parallel upper and lower beam of the Roberval mechanism connected each via first and second flexure point sections with the fixed, respectively the movable column, said mounting hole comprising an inner thread such that a mating outer thread of a fixing screw screwed in the mounting state into the mounting hole up to an axial threading end can be screwed into the mounting hole, the mounting hole having one of the first upper, second upper, first lower, and second lower flexure point section as relatively closest flexure point section. Further, the invention relates to load cells with such monoblock sensor bodies, weighing devices as electronic balances having one or more of such load cells, and also to a method of manufacturing such a monoblock sensor body.

BACKGROUND OF THE ART

Such monoblock sensor bodies are well known in the art. For instance, EP 2 397 824 B1 (see f.i. FIG. 8 of said document) shows such typical monoblock sensor body and also the electromagnetic force compensation mechanism with a force coil and an electromagnetic force generating device as well as a displacement sensor, as well as a support member for connection to the lever arrangement of the single block type sensor mechanism body. It is proposed to integrate a sub-Roberval mechanism into the monoblock sensor body for coupling to an internal (calibration) weight. The monoblock sensor body is fixed to a not shown electronic balance case through an attachment member 7 by screws extending in lateral (width) direction of the monoblock attaching the attachment member 7 to the fixed column of the monoblock sensor body.

Also in DE 196 05 087 A1, such a monoblock sensor body is disclosed. Here, mounting holes are provided in the corner regions of the monoblock and run in length direction of the monoblock.

Also EP 1 643 223 A1 discloses a monoblock sensor body. Therein, a coupling element to couple the lever mechanism to the movable column is provided with thin portions being thin in length direction and also thin portions being thin in width (lateral) direction.

In particular for load cells with high resolution, those monoblock sensor bodies are in particular suitable for high accuracy and performance. It is an object of the present invention to still improve such monoblock sensor bodies with view to good accuracy and performance.

SUMMARY

In order to cope with this object, the invention provides a monoblock sensor body as initially introduced, which is essentially characterized by at least one mounting portion comprising a cavity reducing the available solid angle for straight propagation path running from the inner thread to one or more of the closest flexure point section, coupling and the in particular closest fulcrum while a material boundary of the body closes the cavity over at least a bridging width versus the height-side end of the body corresponding to the closest flexure point section.

By the provided sensor body, measurement accuracy for a given sensor body geometry can be increased by having still satisfying stiffness of the sensor body provided by the closing material boundary of the monoblock sensor body notwithstanding protection of sensor body parts sensible to stresses arriving there via in particular straight propagation paths and resulting from mechanical stress generated f.i. while tightening mounting screws and possibly resulting in a deformation of the original position of sensible elements as f.i. pivot points and pivot axes of said parts as levers of the lever system or the parallel beams of the Roberval mechanism, being then responsible for a limitation of the performance of the load cell.

Constructions of that shown f.i. in DE 196 05 087 A1 have been identified as being problematic for stiffness and stability due to slots cutted from the upper respectively lower side (in height direction) into the monoblock body.

It is to be understood that the closing material boundary closes versus, that is in direction versus the height-end side, but does not necessarily fully arrive at the height level of f.i. an essentially planar surface at top or bottom of the body.

In a preferred embodiment, the closing material boundary at least partly overlaps in its width position with that of the mounting hole. In an additional or alternative featuring, the closing material boundary is present at one or both lateral sides of the monoblock body. Thereby, material paths are generated running from the internal thread up to a portion of the corresponding height-side end (upper or lower side) of the body being in length direction further to the inside of the body than the cavity and passing the cavity to the side of said height-side end, such path having only low or even no component in width-direction. These further increase stiffness and stability of the body.

In a further preferred embodiment, the mounting portion comprises a disc-like sub-portion having a width equal or lower than the width of the body and having, at least in the region without width-overlap with the mounting hole the form of a "two-dimensional" handlebody of at least great one, in the sense that an identical extension of such crosssection orthogonal to the width direction to a non-zero width has the form of a (three-dimensional) handlebody of at least great one.

In a further preferred embodiment, the cavity extends to one or both lateral sides of the monoblock sensor body. The cavity is, the open to the respective side. The lateral side of the body is one of the end sides with respect to the width direction. That is, the cavity opens to the lateral side, and in particular also to both lateral sides, thereby reaching through the monoblock sensor body in width direction. This increases the solid angle as seen in protection orthogonal to the length direction, and also allows cutting elements for cutting at least parts of the cavity through the body.

In a further preferred embodiment, the extension of the cavity and/or side opening in height direction covers a solid angle of, when seen in projection to the height-length plane, larger than 36°, preferably larger than 42°, in particular larger than 48°. This allows, in particular for mounting portions on the side of the movable column, a better coverage even in case that mounting holes are not arranged close to the corners of the body but shifted axially (in height direction) inwards. For the center for said solid angle, the axial threading end at axial position of the mounting hole axis is envisaged. However, at least for one or some mounting portions, such values are preferred also for a center at the opening of the mounting hole.

In this connection it is also, according to one preferred embodiment, provided that the distance in height direction between mounting holes of an upper and a lower mounting portion are lower than 90%, preferably lower than 80%, in particular lower than 70% of the overall height extension of the monoblock body. Said distance between said mounting holes can even be lower than 60%, or lower than 55%, even lower than 50%.

This is in particular for applications where the monoblock sensor is used within a load cell integrated in a check weigher, by which the weight of products can be measured during their transport along a transport path, in particular in constructions where protective elements are provided between the movable column and a load receiving member and/or an intermediate piece or arrangement for coupling to the load receiving member.

In a further preferred embodiment, the cavity (in particular also at its lateral side ends, that is at their opening) comprises, seen in projection to the height-length plane, an elongated slit portion, in particular having a gap dimension orthogonal to the slit extension of lower than 2 mm, preferably lower than 1.2 mm, in particular lower than 0.8 mm, said slit portion being in particular manufactured by wire-electric discharge mechanism. It is even preferred to have said gap lower than 0.7 mm, preferably lower than 0.6 mm, in particular lower than 0.5 mm. It is, however, understood that the gap shall have a gap dimension safely avoiding contact between the two sides spaced apart under regular load and stressed conditions in use of the load cell with the sensor body.

In a further preferred embodiment, the cavity (in particular also at its lateral sides) comprises, as seen in projection to the height-length plane, an enlarged portion with larger gap diameter than that of the slit (in particular of a base form of a circular bore). This allows for application of a preferred manufacture mechanism in form of wire erosion, that is wire-electric discharge mechanism, by introducing a wire through the enlarged portion.

In a further preferred embodiment, the monoblock sensor body has a first such mounting portion at the movable column, its allocated cavity covering both its closest flexure point section and at least part of the coupling. In particular, it is provided that the protection from straight propagation path protects a lower coupling mount for the coupling between the movable column and the first lever of the lever arrangement (the lever arrangement may comprise one or more levers, such that said first lever could be the only lever of the lever system, but there can be additional levers).

In a further preferred embodiment, the monoblock sensor body has a length of the parallel and/or lower beam being at least 30%, preferably at least 36%, in particular at least 42% of the overall length of the body. As overall length of the body, generally the body being a parallelepiped, in particular of general shape of a cuboid, one may take the distance in length direction between the end sides in length direction. However, in case that there may be additional geometry, such as protrusions for mounting other parts of f.i. the electromagnetic force compensation mechanism, or alignment protrusions for (seating) surfaces around the mounting holes, the overall length of body 100 is defined as distance in length direction between the average length position of the seeking surfaces of the mounting holes on the movable and the fixed column when on both sides mounting holes are provided in length direction, otherwise the overall length direction shall be defined as average distance in length direction along the height and width of the monoblock sensor body. In this regard, it is preferred that the mounting holes are, in particular for both movable and fixed column, extending in length direction. However, the invention is generally not restricted to said extension direction, and also other screwing directions can be taken into consideration.

In a further preferred embodiment, the cavity is in connection with its allocated mounting hole or mounting holes, the joining of cavity and mounting hole being in particular further to the inside of the body with respect to the axial threading end, in particular with respect to the axial end of the inner thread (which reaches slightly over but being roughly the axial threading end, in case that the screws provided for mounting are designed such that they match in their length to the axial end of the inner thread when fully screwed in). In this regard, the invention provides also for an arrangement of a monoblock sensor body having one or more of the previously discussed features and a mounting assembly comprising screws and defining an axial threading end for each mounting hole by the axial threading coupling of the distal threading end of the respective screw. The screw should not extend beyond the cavity. In particular when a larger diameter portion of the cavity is arranged in connection to the mounting hole, a washing process after possible surface coating is easier to perform.

In a further preferred embodiment, the monoblock sensor body has mounting holes at two different height positions on each of the movable column and the fixed column and in particular two mounting holes at each side and height position, wherein a plurality, in particular all mounting portions are threaded with said mounting holes having such a cavity. This further increases the stiffness and reduces stress propagation at several mounting portions and for even more sensitive parts of the sensor body.

In a further preferred embodiment, the cavity is of at least two mounting holes having the same closest flexure point section are connected in width direction, thereby forming in particular a cavity region from one lateral end side of the body to its other lateral end side. This is favorable for the manufacturing process and does not significantly affect the stiffness and stability of the monoblock sensor.

In this regard, as already indicated above, the bridging width of the closing material boundary which preferably is over the full width of the monoblock sensor body could also be lower. However, preferably the bridging width is at least 10%, preferably at least 20%, in particular at least 40% of the overall width and/or comprises at least two bridging portions each of a bridging width of at least a material thickness as that of the flexure point section of the Roberval mechanism, and/or of said % values.

Depending on the height position of the mounting holes and other aspects of the overall design of the load cell, the material thickness of the closing material boundary in height direction is appropriately set. It should, however, be at least that of the flexure point section and/or 1 mm, or in particular at least 2 mm. Namely, it is more the presence of the closing material boundary than its thickness in height direction (of course of sufficient own stiffness) generating stability. While it is to be understood that the arrangement of the closing material boundary in height direction can and should preferably reach up to the height-side end of the general outer shape of the body, it should reach a height position having an axial distance in height direction from the respective height-side end of the general outer shape of the body lower than 25% of the overall height extension of the body and/or lower than twice the thickness of the beam in height direction, preferably lower than 15% of said overall extension and/or 1.5 times the thickness of the parallel beam, in particular lower than 10% or even 5% of the overall height dimension and/or 0.75, even 0.5 times the beam thickness.

Further, the invention provides a load cell having such monoblock sensor body and an electromagnetic force compensation mechanism connected to the sensor body. It is to be understood that such load cell shall also have a control of the electromagnetic force compensation mechanism capable of indicating and controlling f.i. the current in a coil for creating the field for the force compensation in correlation to the position of the lever indicative by a position sensor of the mechanism/system.

The invention also provides a weighing device having one or more of such load cells. It is understood that the weighing device may have one common control controlling the electromagnetic force compensation mechanism for each of the incorporated load cells, if there are more than one of them.

Further, the invention provides a method of manufacturing such a monoblock sensor body in accordance with the already discussed manufacturing techniques, in particular drilling and wire-electric discharge mechanism. Preferably, the same manufacturing technique can be used for creating the cavities and for defining the structure of the monoblock sensor body regarding its functional parts as Roberval mechanism and lever mechanism, at least partly the same manufacturing mechanism.

BRIEF DESCRIPTION OF THE DRAWINGS

Further features, details, and advantages of the invention result from the following description with reference to the accompanying figures, wherein.

DESCRIPTION OF EMBODIMENTS

Figure 1:
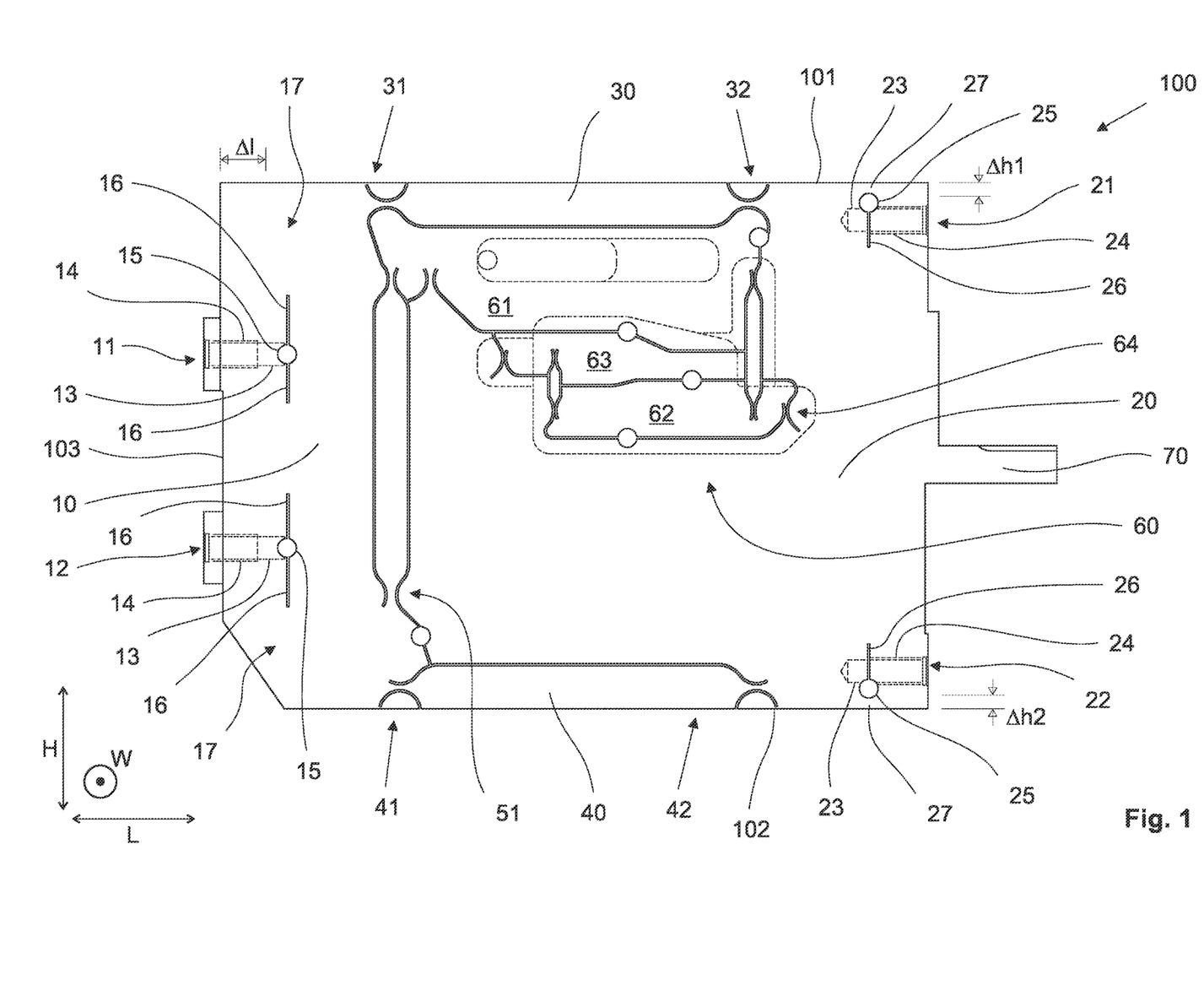
FIG. 1 shows a monoblock sensor body in a side view.

In FIG. 1, a monoblock sensor body 100 is shown in a side view but still with indicated mounting holes, the direction of view corresponding to the width direction W and the paper plane of FIG. 1 corresponding to a height-length-plane. The sensor body 100 comprises, as readily recognizable by the person skilled in the art, a Roberval mechanism having a fixed column 20 and a movable column 10 connected to fixed column 20 by parallel upper beams 30 and 40. The bending section for this parallel construction is denoted by flexure point section 31 between movable column 10 and upper beam 30 (upper left flexure point section), (upper right) flexure point section 32 between upper beam 30 and fixed column 20, (lower left) flexure point section 41 between movable column 10 and lower beam 40, and (lower right) flexure point section 42 between lower beam 40 and fixed column 20.

Coupled to movable column 10 by a coupling with lower coupling mount 51 is a lever arrangement 60, having in the shown embodiment three levers, a first lever 61, a second lever 62 coupled thereto, and a third lever 63 coupled to the second lever 62. It is, however, to be understood that such embodiment with three levers is only one of several possible embodiments for the lever arrangement 60, which could also consist of one lever only, two levers or even a lever arrangement having more than three levers.

The third lever 63 is connectable via a connection element to an electromagnetic force compensation mechanism 200 (see FIG. 2), comprising in ways known to persons skilled in the art an electromagnetic force generating device generating electromagnetic forces which counteract displacement of the movable column in the body due to a load of an object to be measured. Combined with a positioning sensor and respective control (not shown), the load of the object to be measured is measured f.i. via the current required to create counter force indicative of the weight of the load. The subject of the electromagnetic force compensation is well known to the person skilled in the art, and no more explanation is given here. Rather, the disclosure of EP 2 397 824 B1, and DE 196 05 087 A1 is incorporated by reference regarding more explanations about the working principle of electromagnetic force compensation mechanism.

Figure 4:
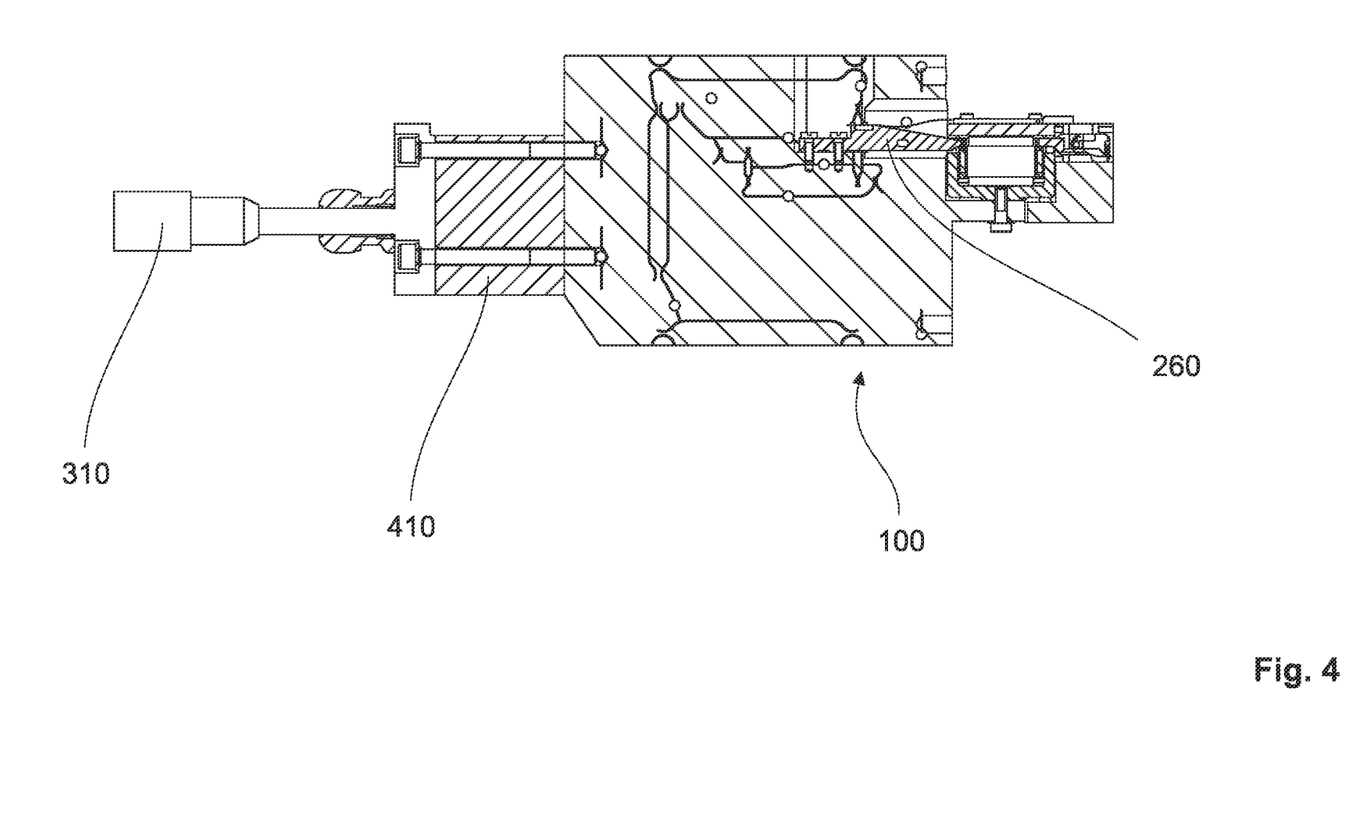
FIG. 4 shows, in a sectional view, the connection between lever mechanism of sensor body to the electromagnetic force compensation mechanism.

Coupling of the third (last) lever 63 of lever mechanism 60 is better seen in FIG. 4, where the connection element has reference numeral 260. One recognizes that connection element 260 is led through an opening in the fixed column 20 and mounted by screws screwed in load direction into lever 63. However, it is to be understood that also other kind of connection couplings are envisaged to be encompassed by the invention, as f.i. lateral prolongation arms laterally mounted to the (last) lever and running sideways of body 100.

Figure 3:
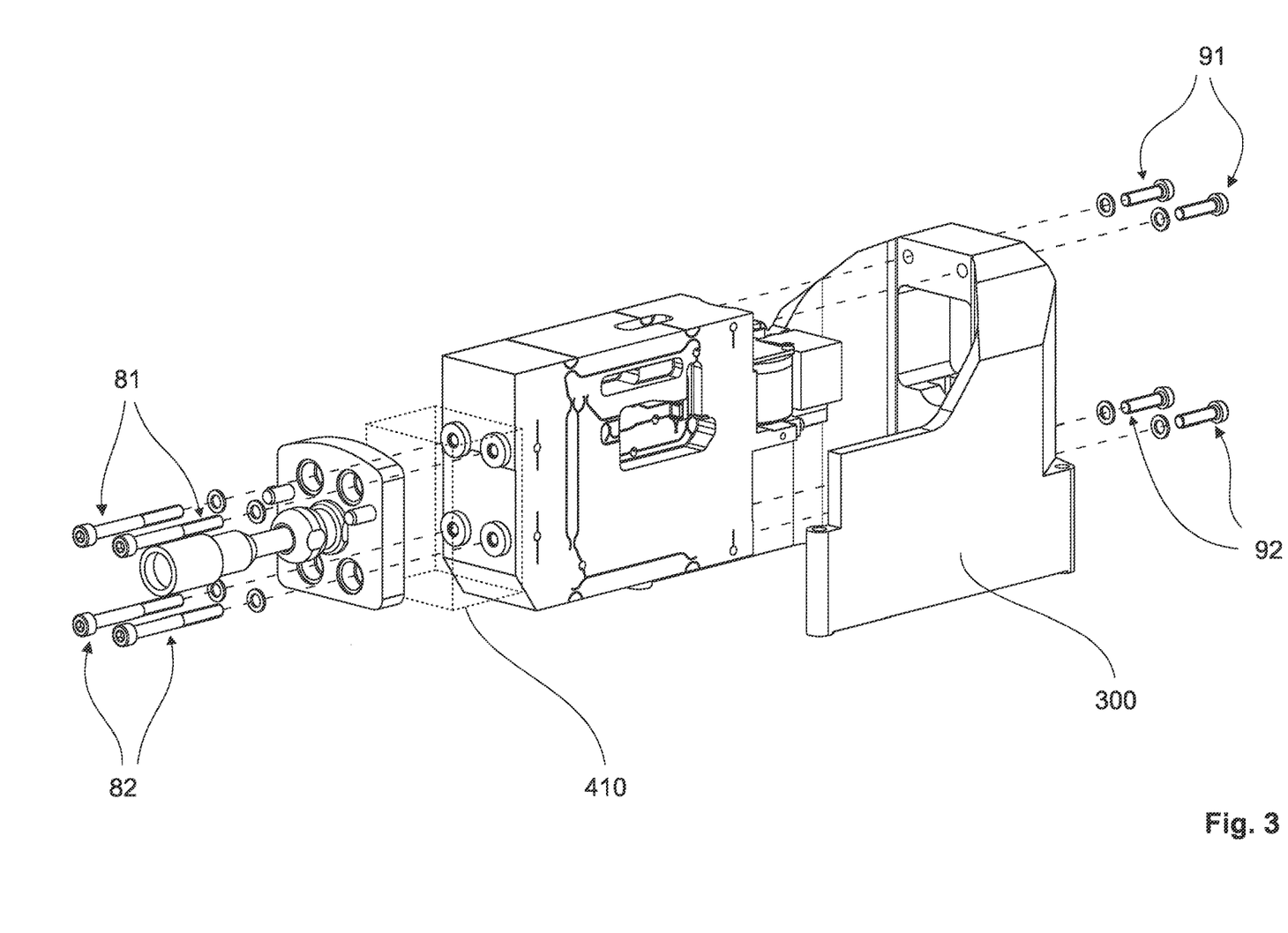
FIG. 3 shows, in an explosive view, the attaching of the monoblock sensor body to a frame, respectively attachments to the monoblock sensor body.

In the embodiment shown in FIG. 1, the body comprises a protrusion 70 to support the electromagnetic force compensation mechanism 200. Of course, it is to be understood that the electromagnetic force compensation mechanism can be supported otherwise, f.i. by an external housing, to which the fixed column 20 is attached. In the subject embodiment, fixing respectively attaching of the fixed column 20 to a frame 300 of a weighing module having monoblock sensor body 100 (FIG. 3) is done via screws 91 and 92 inserted in mounting holes 23, 23 arranged in upper right mounting portion 21, respectively lower right mounting portion 22 of the fixed column 20. The mounting holes 23, 23 extend in the length direction L which is the extension direction of the parallel beam 30, 40. The mounting holes 23, 23 are provided with inner threads 24, 24 to match with not-shown outer threads on screws 91, 92 (FIG. 3). As is understood also from FIG. 3, in the subject embodiment, in each upper right mounting portion 21 and lower right mounting portion 22, two mounting holes are provided adjacent to each other in width direction W at the same height level in height direction H.

Mounting portion 21 has mounting holes 23 quite close to the upper end 101 (in height direction H) of body 100, in the present embodiment within the first 10% of the overall height extension of the body. The mounting hole 23 of lower right mounting portion 22 is arranged close to the bottom side 102 of body 100 with respect to height direction H, and also within 10% of the height extension closest to lower end 102. Other height positioning is possible, however preferably not beyond 25% distance, preferably not beyond 20% with reference to the overall height extension.

On the side of the movable column 10, upper left mounting portion 11 is provided within the upper half in height direction H, and lower left mounting portion 12 is provided within the lower half thereof. Of course, the height positions of the mounting holes may be different depending on what is to be attached, as f.i. an L-shaped connecting part. In particular, both mounting holes could also be arranged rather close together and within the same half. Also at this side, as better visible from FIGS. 2 and 3, at the height level of upper/lower left mounting portion 11, 12, two mounting holes 13 are provided with respective inner threads 14 to match with outer threads of fixing screws 81, 82. The mounting holes 23 have surrounding seating surfaces 19 slightly protruding from (length) side end 103 of block 100.

These fixing screws 81, 82 can fix a load receiving member 310 to the movable column 10; interposed between load receiving member 310 and movable column 10 is a connecting part 410 which could be in form of a spacer. The arrangement of the load receiving member 310 is best seen in the sectional view of FIG. 4 for an exemplary arrangement of the weighing module having sensor body 100 within a weighing system where products are weighed during transport. However, it is to be understood that the subject invention is not limited to these applications, but can be used for any kind of weighing systems, including those where f.i. the load receiving member is a load plate for receiving an object to be weighed in a standstill configuration. In this regard, the invention is not limited, and the monoblock sensor body 100 can be used for any kind of load measuring systems, electronic weighing scales, in particular for high resolution weighing modules.

Preferably, the load cell is for high resolution of better than 1/1000, preferably than 1/5000, even than 1/10000, or than 1/50000 for the ratio of resolvable increment and maximum load.

Figure 2:
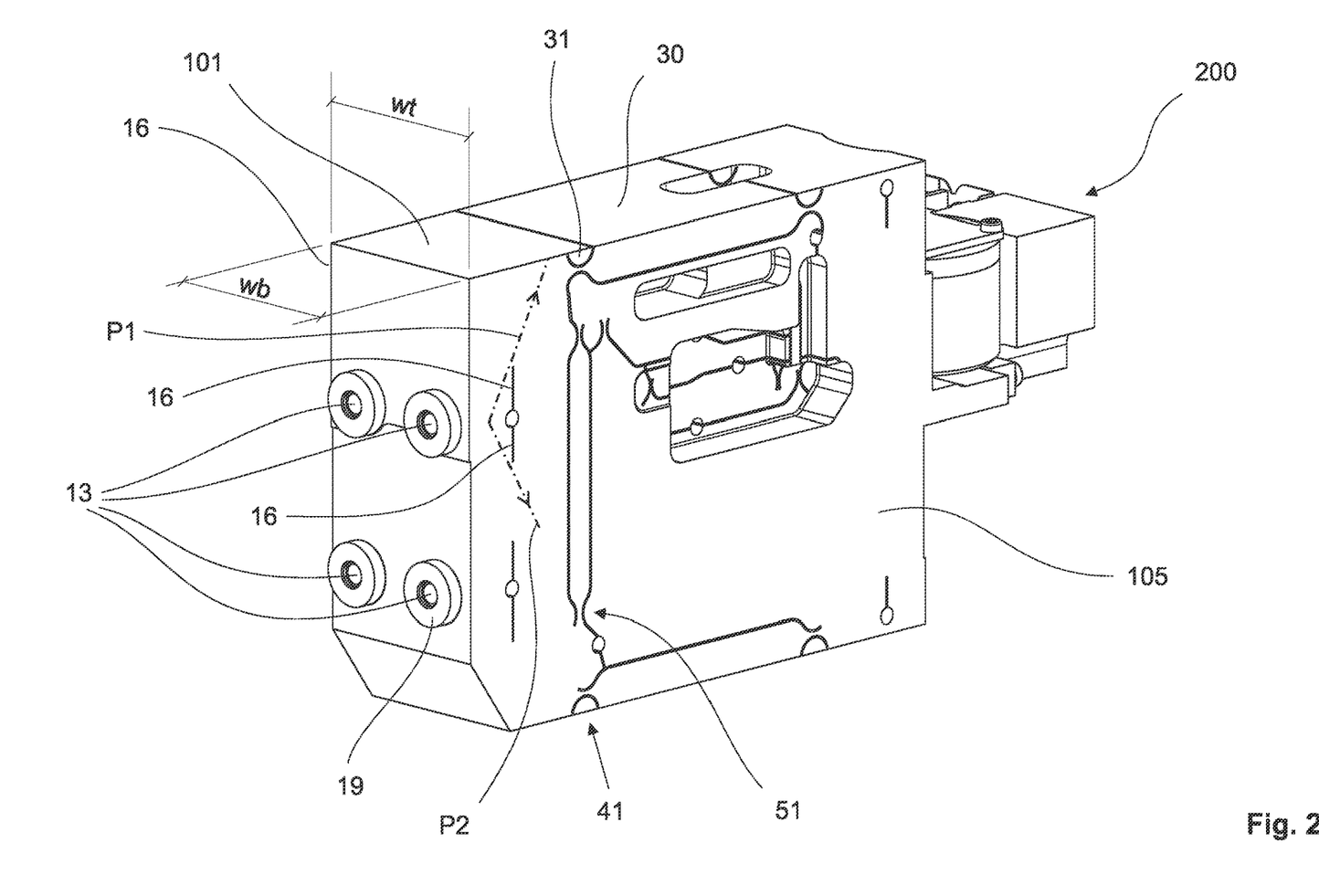
FIG. 2 shows the monoblock sensor body in a perspective view, and also part of an electromagnetic force compensation mechanism.

As is best visible from FIG. 2, the upper end 101 at the length extension of the fixed column 20 as well as at the length extension of the movable column 10 is, in the present exemplary embodiment, free from indentations, slots, or bores, as well it is the lower end side 102, even if not visible in FIG. 2. Rather, solid (bridging) portions 17, 27 are present integral with block body 100. This provides that full holding support over the overall height of the body is given, which provides for good stability of the monoblock sensor body. However, full material coverage at the top side 101, respectively the bottom side 102 is a preferred option and partial slots, indentations, or weight-saving portions of removed material can be provided without essentially changing the structural integrity of the body in terms of stiffness.

Notwithstanding this favorable stability, the flexure point sections 31, 32, 41, and 42 as well lower coupling mount 51 and the coupling between first and second lever as well as the fulcrum of the second lever are still protected from mechanical stress which may be created in particular when the fixing screws 81, 82, 91, and 92 are screwed into mounting holes 13, 23, in particular when they are tightened. This is because each mounting portion comprises a cavity 15, 16, respectively 25, 26 close to the mounting holes 13, 23, and even crossing in the exemplified embodiment said mounting holes 13, 23.

In the shown exemplified embodiment, the major part of the height extension of cavities 15, 16, respectively 25, 26 are formed by slits or slots. In the present exemplified embodiment, these slots are formed by wire-electric discharge, that is by an erosion process. To this end, first bores 15, respectively 25 extending in width direction W entirely through the overall width of the sensor body 100 are provided, allowing the insertion of the wire for manufacturing slits 16. As one can take from the way of representation of slits 16, 26 and also those slots in the material of the sensor body 100 defining the substructures of the beams 30, 40 and the levers of the lever arrangement 60, the same manufacturing technique can be used as that for defining the geometry of said substructure of the sensor body.

However, it is to be understood that such slots could be machined also by appropriate cutting tools as rotary cutting discs or by other chipping material or any other kind of metal-cutting technology, f.i. by milling. One may also use water jet cutting or laser cutting.

When seen in the height-length plane (paper plane of FIG. 1), the respective projection of the solid angle coupled by cavity 15, 16 is roughly 80° when setting the center for solid angle measurement at the mounting hole entrance on lengthwise end 103 of body 100, and close to 120° when setting said center to the axial threading end, axial distance by $\Delta l$ in lengthwise direction from left length end 103 of sensor body 100. Thereby, regarding straight propagation paths starting from the threading, in particular at threading end and propagating versus f.i. lower left flexure point section 41 and lower coupling mount 51 are stopped by cavity portions 16 of a cavity of mounting portion 12, and likewise the other flexure point sections are protected via the cavities of the other mounting portions.

Figure 5:
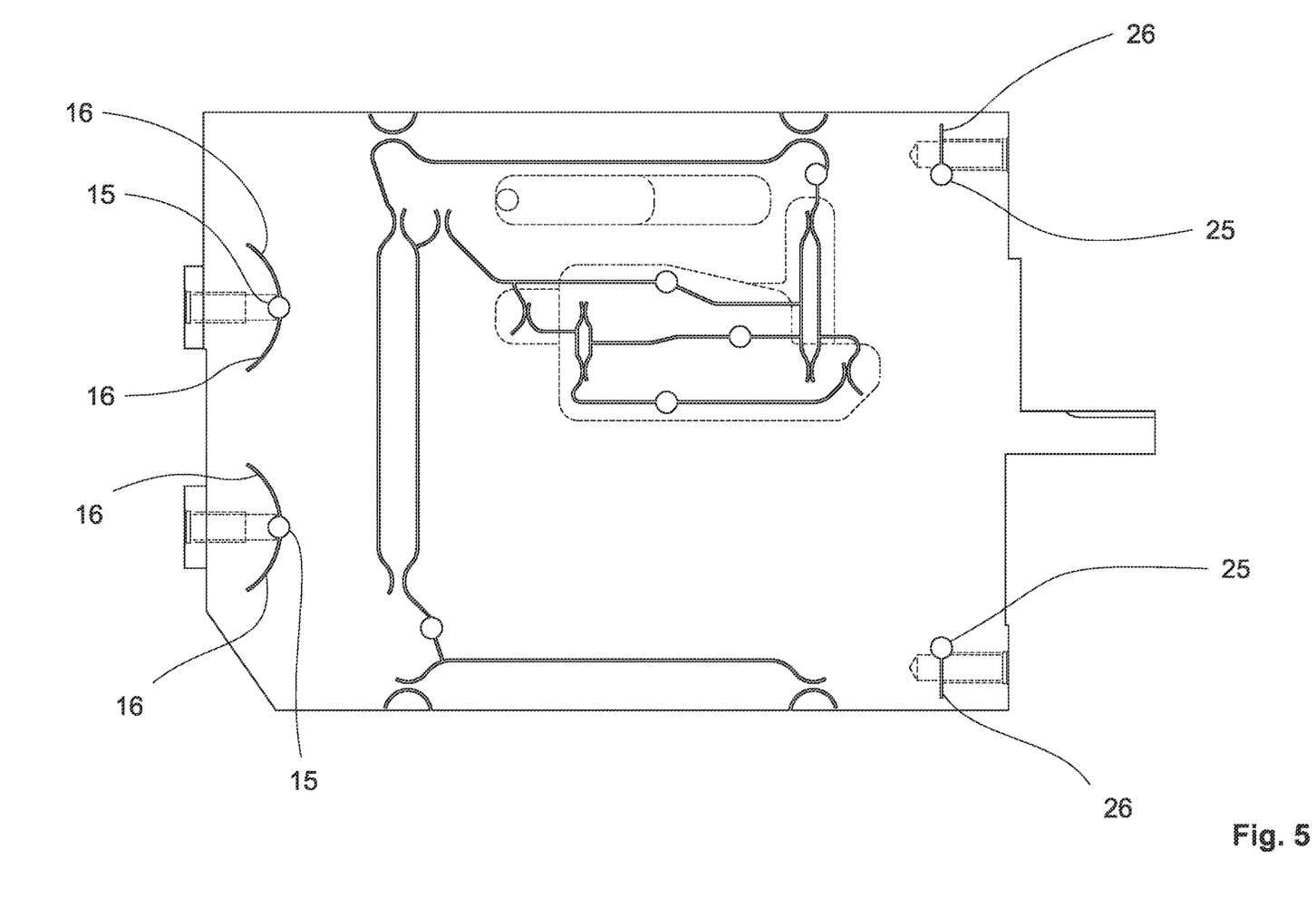
FIG. 5 shows a view as that of FIG. 1, for still another embodiment.
Figure 6:
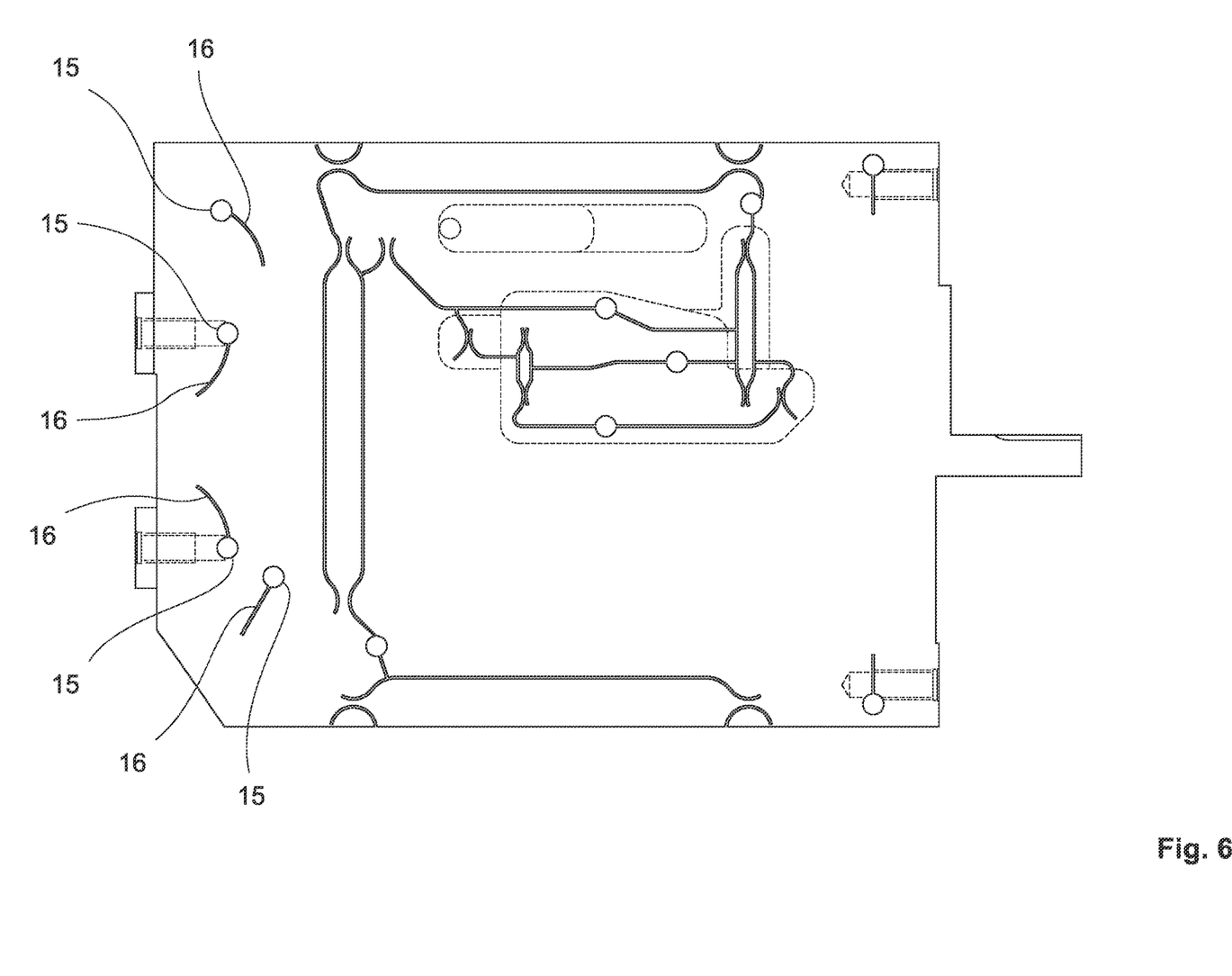
FIG. 6 shows a view as that of FIG. 1, for still another embodiment.
Figure 7:
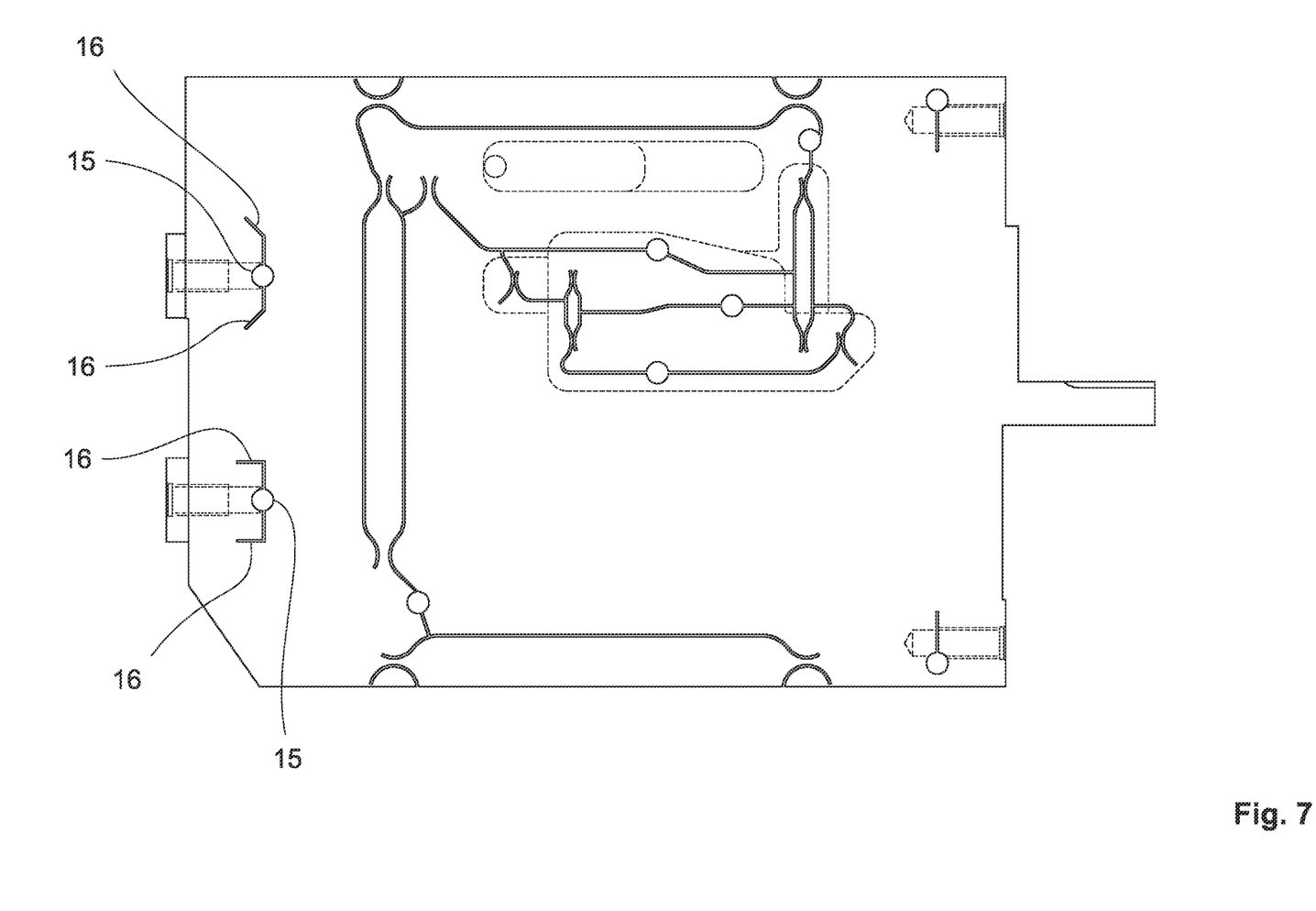
FIG. 7 shows a view as that of FIG. 1, for still another embodiment.

It is to be understood that the shape of the cavities is not limited to that shown in FIG. 1. For instance, the slot portions could be curved, to effectively provide protection for similar solid angles, or axially displaced in length direction with respect to the situation shown in FIG. 1. However, connection of the mounting holes 13, 23 to respective cavities 15, 16, respectively 25, 26 is preferred. Moreover, the cavities protecting the flexure point sections and other sensible portions of the sensor body do not need to be connected in width direction, as is the case in the exemplarily shown embodiments also with view to a preferred manufacturing technique. The cavity of a mounting portion could also be composed of two or more single cavities not connected with each other but still protecting the sensitive elements closed thereby from direct propagation path stress transmission. Some other examples of cavities are shown in FIG. 5, FIG. 6 and FIG. 7.

For the cavities 25, 26 at the mounting portions at the fixed column 20, the threading end and the positioning of the cavity essentially coincide in lengthwise positioning, such that there is, in projection to the height-length plane, a coverage angle of about 180°. Moreover, although the mounting holes 23 are, in the exemplified embodiment, much closer to the end sides 101, respectively 102 in comparison to the arrangement at the movable column 10 side, there is still material of thickness $\Delta h1$, respectively $\Delta h2$ in height direction allowing holding force path starting from the mounting hole passing to the upper side 101, via bypassing the cavity 25, 26 of upper right mounting portion 21 to the side of upper side 101, respectively reaching bottom side end 102 from mounting hole 23 of lower right mounting portion via bypassing its allocated cavity 25, 26 from below.

These paths available for holding forces according to the present invention are given at least over a bridging width wb of the width extension of the cavity not withstanding its presence and protective effect for the sensible parts of the sensor body. For the shown embodiment, bridging width wb is equal to overall width wt, but is can also be lower, see above.

In the perspective view of FIG. 2, also the electromagnetic force compensation mechanism 200 is shown, supported by protrusion 70. Moreover, straight propagation paths P1 and P2 are indicated as those straight propagation paths being the closest not-blocked paths due to cavity portions 16. One recognizes that the upper one P1 of these paths reaches upper end side 101, as seen in length direction, before the arrangement of the upper left flexure point section 31, which is, thus, protected. Also lower coupling mount 51 of the coupling of the movable column 10 to the first lever 61 is protected, first straight propagation path P2 bypassing cavity portion 16 from below does reach said coupling mount 51, but could, in an alternative embodiment, also be blocked by having slit 16 of mounting portion 11 extending further downward or curved (see, f.i. FIG. 5). The same holds for a not-shown propagation path starting from threading end of the lower left mounting portion 12 versus upper end side 101, while again a straight propagation path starting therefrom versus bottom end side 102 does not reach the lower left flexure point section 41.

It is understood that the extension of the cavity might change with the height position of the mounting holes 13, 23 and/or the height positioning of the center of the cavity in height direction with respect to the height positioning of the mounting hole 13 may change depending on the absolute height position of mounting hole 13 with respect to upper end side 101 for mounting portion 11, 21 and lower end side 102 with respect to lower mounting portions 12, 22.

In FIG. 5, which is a view similar to that of FIG. 1, a further embodiment of the invention is shown. Most parts are identical to that of the embodiment of FIG. 1, and are no more explained again. The embodiment of FIG. 5 differs from that of FIG. 1 in the shape/extension of slit portions 16, 26 of cavities 15, 16, and by the positioning of bore portion 25. Here, curved arrangements for the slot portions 16 are provided, still covering roughly the same solid angle as in the embodiment of FIG. 1.

For the embodiments of FIG. 6 and FIG. 7, one recognizes on the side of the movable column 10 a cavity arrangement having disconnected sub-cavities. Accordingly, as one can recognize from the embodiments of FIGS. 1, 5, 6 and 7, several positioning and shape changes of the cavities can be made which still cover the sensitive elements of the monoblock body 100 while keeping satisfied stiffness and stability provided by closing material boundary portions 17, 27.

Further, it is understood that the detail features of the exemplified embodiment are not limiting the scope of the subject invention. Rather, features of the preceding description as well as of the subsequent claims, alone or in combination, may be essential for the invention in its various embodiments.

LIST OF NUMERALS

10 Movable column
11, 12 Mounting portions
13 Mounting hole
14 Inner thread
15 Cavity portion
16 Cavity portion
17 Closing material boundary portion
19 Seating
20 Fixed column
21, 22 Mounting portions
23 Mounting hole
24 Inner thread
25 Cavity portion
26 Cavity portion
27 Closing material boundary portion
30 Other parallel beam
31, 32 Upper closest flexure points
40 Lower parallel beam
41, 42 Lower flexure point sections
51 Lower coupling mount
60 Lever arrangement
61 First lever
62 Second lever
63 Third lever
64 Fulcrum of second lever
70 Protrusion
81, 82 Screws
91, 92 Screws
100 Monoblock sensor body
101 Upper side
102 Lower side
103 Length side (of movable column)
105 Lateral side
200 Electromagnetic force compensation mechanism
260 Connection element
300 Frame of Housing
310 Load receiving member
410 Connecting part
H Height direction/Load direction
W Width direction/Lateral direction
L Length direction
$\Delta l$ Length dimension
$\Delta h1$, $\Delta h2$ Height dimension
Wb Width dimension
Wt Total width dimension
P1, P2 Propagation path

What is claimed is:

1. A monoblock sensor body of a load cell based on an electromagnetic force compensation mechanism, the sensor body comprising:
   a Roberval mechanism, comprising:
   a fixed column;
   a movable column;
   an upper beam;
   a lower beam, parallel to the upper beam, wherein the upper beam and lower beam are each connected by a first flexure point section to the movable column and by a second flexure point section to the fixed column, thereby defining a first upper, a second upper, first lower and second lower flexure point section;

a lever arrangement that is coupled to the movable column on a first side by a coupling and that is connectable on a second side to the electromagnetic force compensation mechanism, the lever arrangement having at least one lever, each lever associated with a fulcrum;

a plurality of mounting portions for mounting the fixed column to a housing side of a weighing module, directly or indirectly via an intermediate arrangement, and/or for mounting a load receiving member to the movable column, directly or via an intermediate arrangement, wherein at least one of the mounting portions comprises at least one mounting hole that extends preferably at least predominantly orthogonal to a load direction, especially along a length direction of the upper beam and the lower beam, each mounting hole comprising an inner thread such that, in a mounted state, a mating outer thread of a fixing screw that is screwed into the mounting hole up to an axial threading end configured to be screwed into the mounting hole, with each mounting hole having one of the flexure point sections as a relatively closest flexure point section; and at least one cavity, each cavity associated with one of the mounting portions and reducing an available solid angle of a straight propagation path that runs from the inner thread to at least one of: the closest flexure point section, a coupling and the closest fulcrum, wherein, for each cavity, a closing material boundary of the body closes the cavity over at least a bridging width versus the height-side end of the body corresponding to the closest flexure point section.

2. The monoblock sensor body of claim 1, wherein a width of the closing material boundary at least partly overlaps a width of the mounting hole.

3. The monoblock sensor body of claim 1, wherein the cavity extends to a lateral side of the monoblock sensor body.

4. The monoblock sensor body of claim 1, wherein a solid angle of at least 36° in the height direction is covered, when seen in projection to a height-length plane, by at least one of: the extension of the cavity and the side opening.

5. The monoblock sensor body of claim 1, further comprising:

an elongated slit portion, seen in projection to the height-length plane, having a gap dimension of less than 2 mm orthogonal to an extension of the slit portion.

6. The monoblock sensor body of claim 5, wherein the elongated slit portion is manufactured by wire-electric discharge mechanism.

7. The monoblock sensor body of claim 5, wherein at least one of: the side opening and the cavity comprises:

an enlarged portion, as seen in projection to the height-length plane, with a larger gap dimension than that of the elongated slit portion, in particular of a base form of a circular bore.

8. The monoblock sensor body of claim 1, wherein at least one of the mounting portions at the movable column and the associated cavity cover both the closest flexure point section and at least part of the coupling.

9. The monoblock sensor body of claim 1, wherein the upper and lower beam each has a length that is at least 30%, preferably at least 36%, in particular at least 42% of an overall length of the body.

10. The monoblock sensor body of claim 1, wherein each cavity is connected with the associated mounting hole, such that the cavity and the mounting hole are joined in particular further to the inside of the body with respect to the axial threading end of the mounting hole and, in particular, with respect to the axial end of the inner thread.

11. The monoblock sensor body of claim 10, wherein:

the movable column and the fixed column each has mounting holes located at two different height positions;

in particular, two mounting holes are located at each side and height position, and all of the mounting portions associated with the mounting holes have associated cavities.

12. The monoblock sensor body of claim 1, wherein at least two mounting holes having the same closest flexure point section have associated cavities that are connected in the width direction, thereby forming a cavity that reaches from one lateral end side of the body to the other lateral end side.

13. A load cell comprising:

a monoblock sensor body configured according to claim 1; and an electromagnetic force compensation mechanism connected to the lever arrangement of the sensor body.

14. A weighing device comprising:

one or more load cells configured according to claim 13, having a load receiving member fixedly mounted, directly or indirectly, to the movable column of the monoblock sensor body of the load cell.

15. A method of manufacturing a monoblock sensor body configured according to claim 1, the method comprising the step of:

creating, by material removal, the cavity while leaving the closing material boundary of the body.

16. The method of claim 15, comprising the further step of:

defining in the monoblock sensor body, by material removal, at least one of the Roberval mechanism and the lever mechanism in the monoblock sensor body, in particular with the same material removal technique of that of the creating step.

17. The method of claim 16, wherein the material removal, of at least one of the creating step and the defining step, comprises at least one of:

a first step of cutting, in particular drilling, a first cavity to accommodate a wire of a wire-electric discharge mechanism, to then extend the cavity by creating one or more slit portions to one or both sides in the height direction by erosion with the wire-electric discharge mechanism, or a step of cutting the cavity with water jet cutting.

* * * * *